(12) United States Patent
Gao et al.

(10) Patent No.: US 7,864,470 B2
(45) Date of Patent: Jan. 4, 2011

(54) PATTERNED MEDIA WITH SPACINGS ADJUSTED BY A SKEW FUNCTION

(75) Inventors: Kaizhong Gao, Eden Prairie, MN (US); Olle G. Heinonen, Eden Prairie, MN (US); Rene Johannes Marinus Van De Veerdonk, Wexford, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 345 days.

(21) Appl. No.: 11/870,858

(22) Filed: Oct. 11, 2007

(65) Prior Publication Data

US 2009/0097152 A1  Apr. 16, 2009

(51) Int. Cl.
*G11B 5/09* (2006.01)
(52) U.S. Cl. .............................. 360/51; 360/18; 360/48; 360/76
(58) Field of Classification Search ........................ None
See application file for complete search history.

(56) References Cited

U.S. PATENT DOCUMENTS

| | | | |
|---|---|---|---|
| 6,738,207 B1 | 5/2004 | Belser et al. ................... 360/31 |
| 6,778,343 B2 * | 8/2004 | Nunnelley .................... 360/31 |
| 6,838,195 B2 | 1/2005 | Weller et al. .............. 428/842.2 |
| 6,937,421 B2 | 8/2005 | Rubin et al. .............. 360/77.01 |
| 6,977,108 B2 | 12/2005 | Hieda et al. ................. 428/64.2 |
| 7,141,317 B2 | 11/2006 | Kikitsu et al. ................ 428/829 |
| 2002/0068195 A1 | 6/2002 | Lundstrom .................... 428/694 |
| 2003/0179481 A1 | 9/2003 | McNeil et al. ................. 360/48 |
| 2004/0080847 A1 | 4/2004 | Lundstrom .................... 360/46 |
| 2005/0142285 A1 | 6/2005 | Kitade et al. ................. 427/128 |
| 2005/0157597 A1 | 7/2005 | Sendur et al. ............ 369/13.55 |
| 2005/0271819 A1 | 12/2005 | Wago et al. .................. 427/259 |
| 2006/0061900 A1 * | 3/2006 | Ohtsuka et al. ............... 360/69 |
| 2006/0139814 A1 | 6/2006 | Wachenschwanz et al. .. 360/317 |
| 2006/0222761 A1 | 10/2006 | Albrecht et al. ............. 427/127 |
| 2006/0263642 A1 | 11/2006 | Hieda et al. ................. 428/826 |
| 2006/0285257 A1 | 12/2006 | Albrecht et al. ............. 360/319 |
| 2007/0258161 A1 | 11/2007 | Richter et al. ................. 360/48 |
| 2008/0002269 A1 * | 1/2008 | Sakurai et al. ................ 360/48 |

* cited by examiner

*Primary Examiner*—Jason C Olson
(74) *Attorney, Agent, or Firm*—Alan G. Rego; Westman, Champlin & Kelly, P.A.

(57) ABSTRACT

Recording media comprises multiple first and second patterned media islands sequentially placed at different first and second radii along a length of a recording track. A recording head sequentially accesses the first and second islands as the head moves along a length of the recording track. Circumferential spacings between sequential first and second islands along the length of the track vary as a skew function of a track radius.

22 Claims, 7 Drawing Sheets

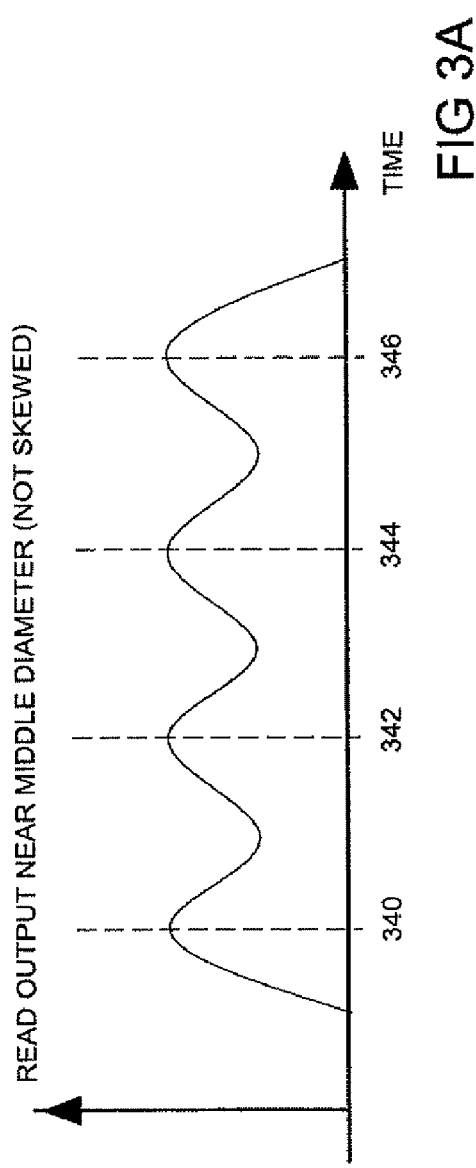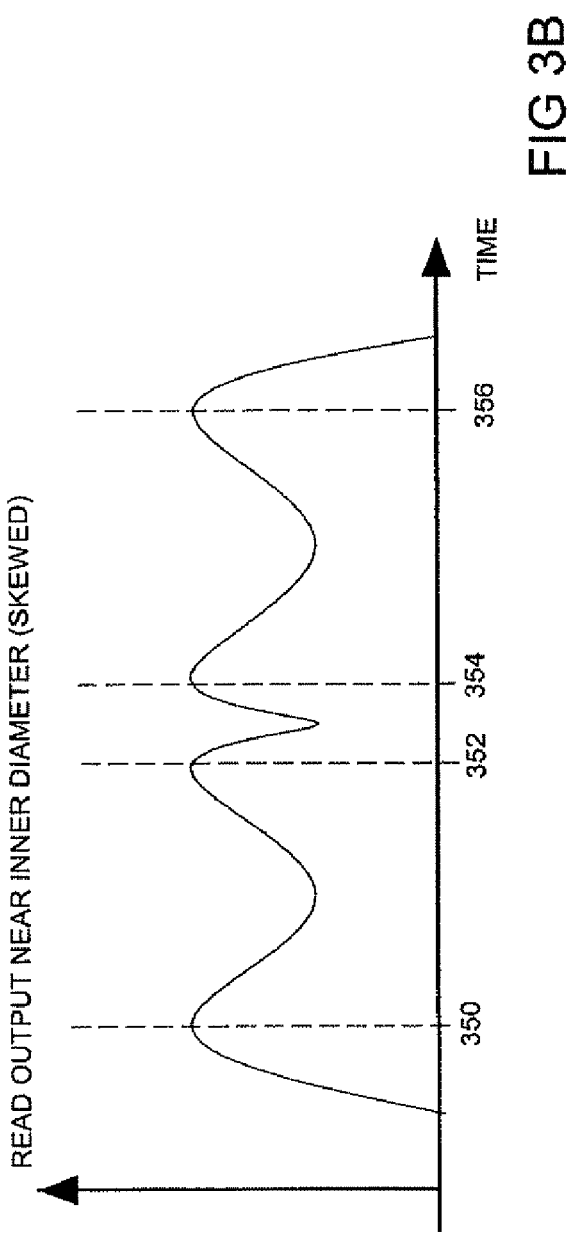

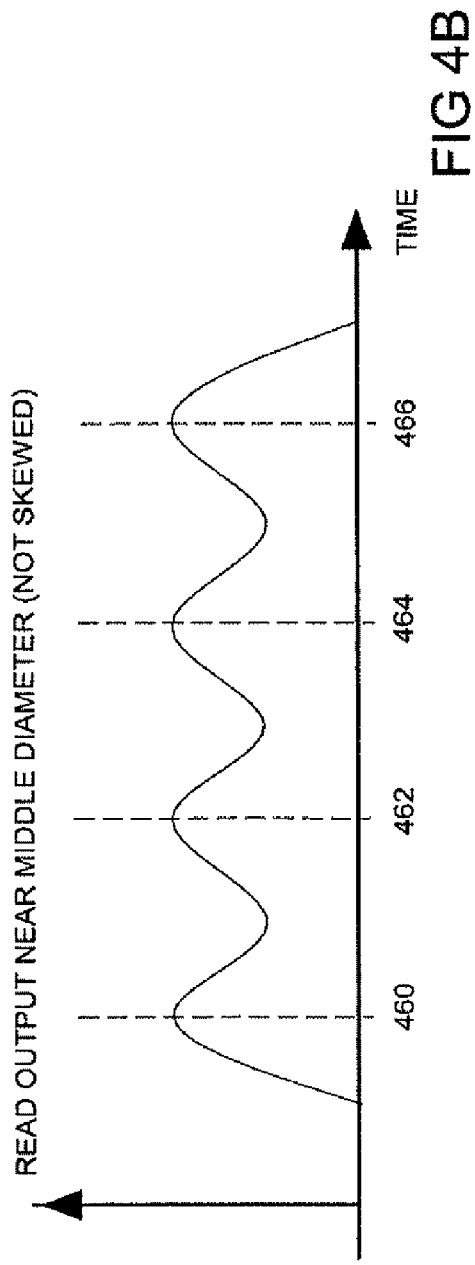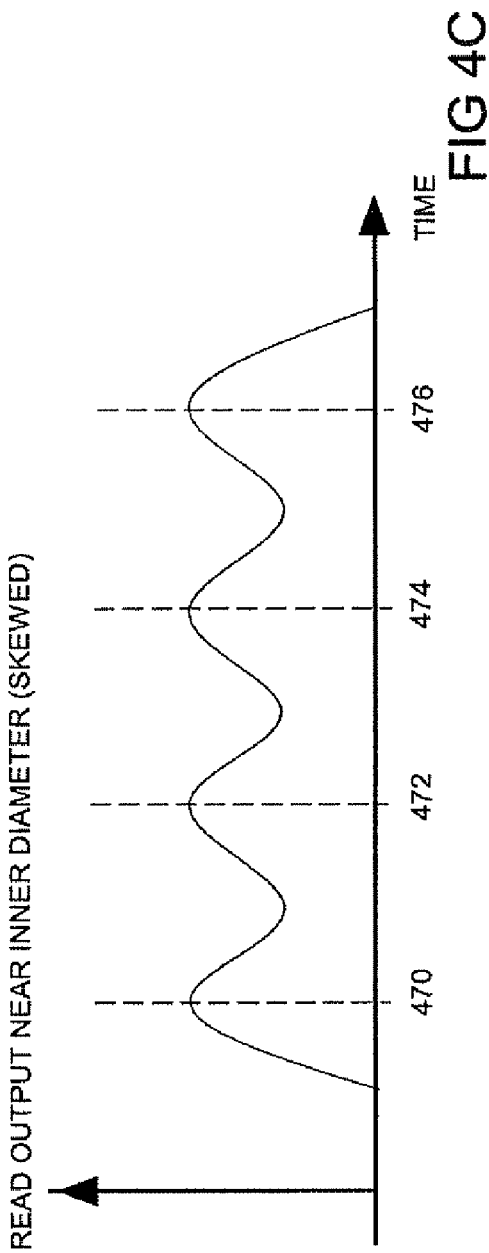

PATTERNED MEDIA WITH SPACINGS ADJUSTED BY A SKEW FUNCTION

FIELD

The present invention relates generally to data recording, and more particularly but not by limitation to patterned data recording media.

BACKGROUND

Skew angle is an inherent problem for patterned magnetic recording where the head moving direction and the writer trailing edge cannot be kept at a constant angle (aligned 90 degrees, ideally) as the head position changes from disc inside diameter (ID) to disc outside diameter (OD). This variation of alignment leads to deterioration of signal-to-noise ratio (SNR) and bit error ratio (BER) as well as leading to potential erasure problems. Several electronic methods have been tried to address this issue and still a BER deterioration is observed with patterned recording media in spite of these electronic methods.

Aspects of the present embodiments provide solutions to these and other problems, and offer other advantages over the prior art.

SUMMARY

Disclosed is recording media. The recording media comprises multiple first and second patterned media islands sequentially placed at different first and second radii along a length of a recording track. A recording head sequentially accesses the first and second islands as the head moves along a length of the recording track. Circumferential spacings between sequential first and second islands along the length of the track vary as a skew function of a track radius.

According to one aspect, the skew function provides compensation for changes in a skew angle of the head. The compensation reduces timing variation in reading and writing data to the first and second islands. According to another aspect, the spacings between successive first and second islands alternate between a shorter spacing and a longer spacing.

Other features and benefits that characterize aspects of the present invention will be apparent upon reading the following detailed description and review of the associated drawings.

BRIEF DESCRIPTION OF THE DRAWINGS

FIGS. 3A, 3B illustrate timing of read signals with different skew angles of the read head.

FIGS. 4B, 4C illustrate timing of read signals for the media of FIG. 4A.

DETAILED DESCRIPTION

In the aspects described below in FIGS. 1, 4-5, recording tracks of patterned recording media, comprises multiple first and second patterned media islands sequentially placed at different first and second radii along a length of the recording track. Circumferential spacings between sequential first and second islands along the length of the track vary as a skew function of a track radius. The spacing is measured from a center of one island to a center of another island along a circumferential path. The varying of mechanical spacing reduces timing variation and reduces the sensitivity of bit error rate to skew angle.

Figure 1:
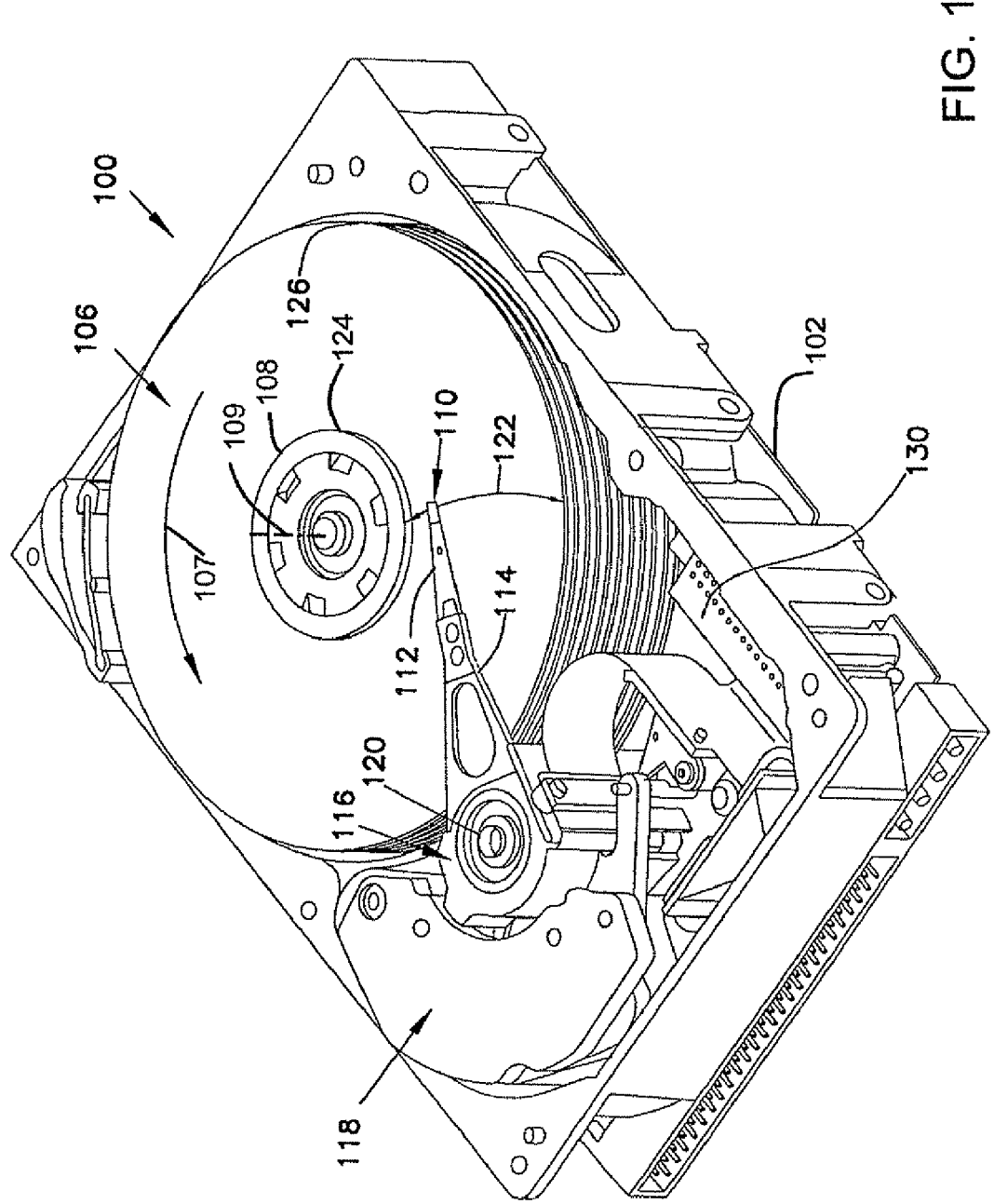
FIG. 1 is an isometric view of a disc drive.

FIG. 1 is an oblique view of a disc drive 100 in which aspects of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central (spin) axis 109 in a direction 107. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
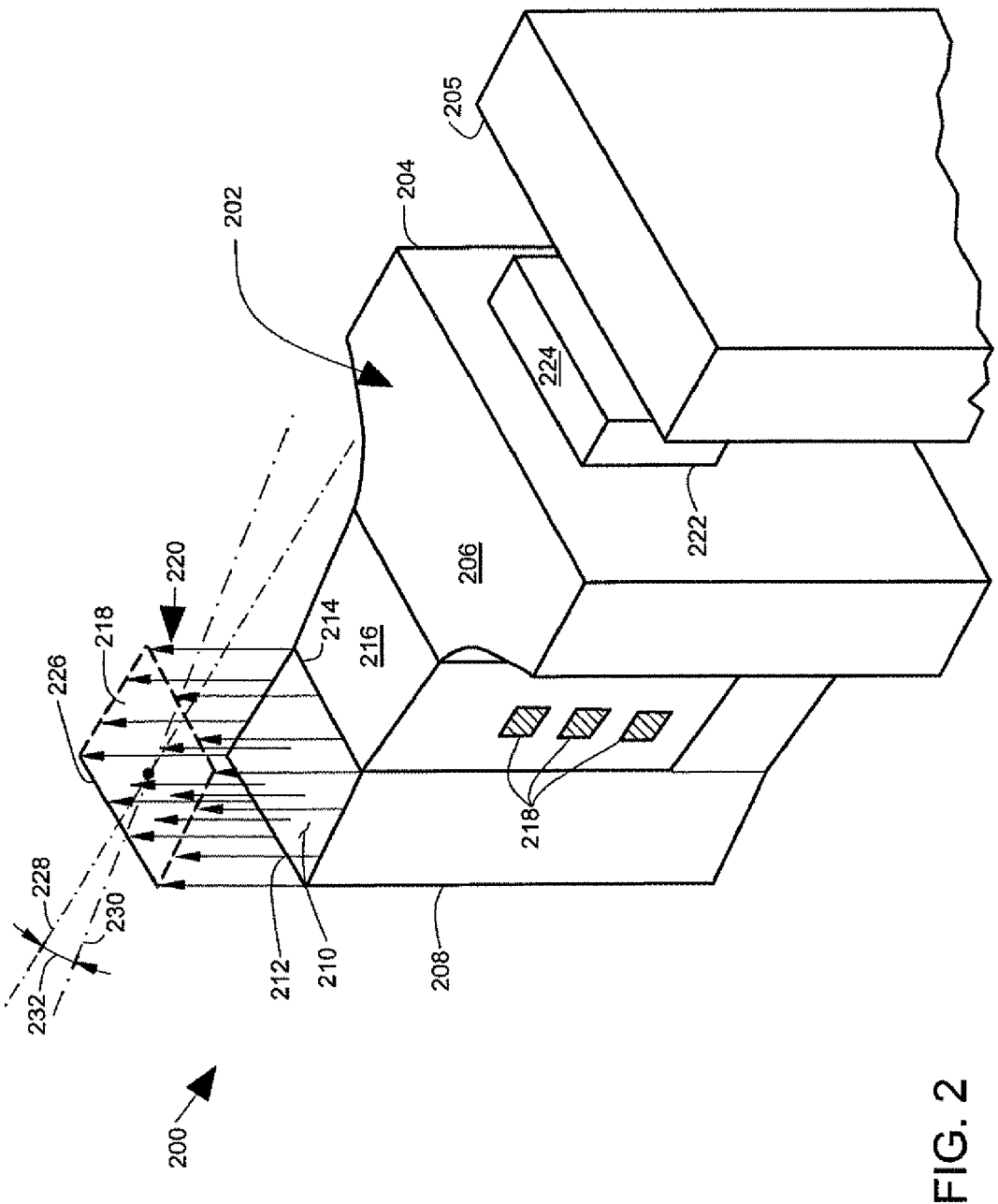
FIG. 2 illustrates an exemplary read/write head for use with stagger mode perpendicular recording media.

FIG. 2 illustrates an exemplary read/write head 200 for use with stagger mode perpendicular recording media. The term "stagger mode perpendicular recording media", as used in this application, means patterned media in which recording media islands are placed at staggered locations at multiple radii in a recording track. In a recording track with media islands at two radii, for example, media islands are alternately placed on circular or spiral tracks at the two radii.

The read/write head 200 comprises an air bearing surface 202 that is part of a larger air bearing surface of a slider (not illustrated in FIG. 2). A write portion of the read/write head 200 comprises a shield 204 on a leading side of read/write head 200. The shield 204 comprises a shield surface 206 that is part of the air bearing surface 202. The shield surface 206 faces magnetic media (not illustrated in FIG. 2) across an air bearing layer.

A write pole 208 comprises a write pole surface 210 that is part of the air bearing surface 202. The write pole surface 210 faces the magnetic media across the air bearing layer. The write pole surface 210 has an approximately quadrilateral tapered shape that extends from a wider trailing edge 212 to a narrower leading edge 214.

The write portion of the read/write head 200 comprises a gap layer 216. A write coil 218 is embedded in the gap layer 216. An electric current in the write coil 218 induces a write magnetic field that passes through the write pole 208, through the shield 204 and through an external path that passes through the magnetic media. The write pole surface 210 has a considerably smaller surface area than the shield surface 206.

Magnetic flux density is concentrated enough at the smaller write pole surface 210 so that the write pole 208 can write data on the magnetic media. Magnetic flux density is diffused enough at the larger shield surface 206 so that the shield 204 cannot write data on the magnetic media. The tapered quadrilateral shape of the write pole surface 210 defines a similar tapered quadrilateral write field shape 218 of a write field 220 that is applied across the air bearing layer to the magnetic media. The write field shape 218 has a write width 226 that approximately corresponds with a track width on the magnetic media. The write width 226 is wide enough to alternately read multiple staggered islands at different disc radii on stagger mode recording media. The write width 226 is approximately transverse to a longitudinal write field axis 228 of the head 200. The longitudinal write field axis 228 is aligned at a variable acute angle 232 with a spin motion axis 230 of the magnetic media adjacent the write field 220. The alignment of axis 228 with axis 230 varies, however, as the head 200 moves across the media surface under control of a voice coil motor (such as voice coil motor 118 in FIG. 1). The variable acute angle 232 between the axis 228 and the axis 230 is referred to here as a skew angle 232. The skew angle 232 is a measure of misalignment of the longitudinal write axis 228 with a track on the media surface. The skew angle 232 is measured in a plane parallel to the media surface.

The read/write head 200 comprises a magnetoresistive read element 222 between shields 204, 205. The read element 222 comprises a read element surface 224 that is part of the air bearing surface 202. The read element surface 224 faces the magnetic media across the air bearing layer 202. The read element 222 reads data from the magnetic media. The read element 222 is wide enough to alternately read multiple staggered islands at different radii on stagger mode recording media.

Patterned recording media comprises an array of magnetic islands that are spaced apart from one another on a media surface. The spaces between the patterned islands are filled with a non-media material to provide a smooth surface for the read/write head to fly over. The non-media material separates the magnetic islands from one another. Circumferential spacings between islands are measured circumferentially along a length of a track. The magnetic islands can be round, oval or another shape. A bit of data is recorded on one or more of the islands. With stagger mode media, the islands are not aligned along a single radius in a track but are alternately staggered at different radii in the track. Islands in a track are alternately at different radii from a media spin axis (e.g., axis 109 in FIG. 1) and are also circumferentially staggered by a stagger spacing. Each track has its own stagger spacing. Within a track, a stagger spacing can be a fixed value all the way around a track, regardless of whether the spacing goes from an island on a smaller radius to a successive island on a larger radius, or from an island on a larger radius to a successive island on a smaller radius. However, it is found that such fixed stagger spacing results in increasing misalignment as the skew angle increases toward the inner or outer diameter of a media surface.

Figure 7:
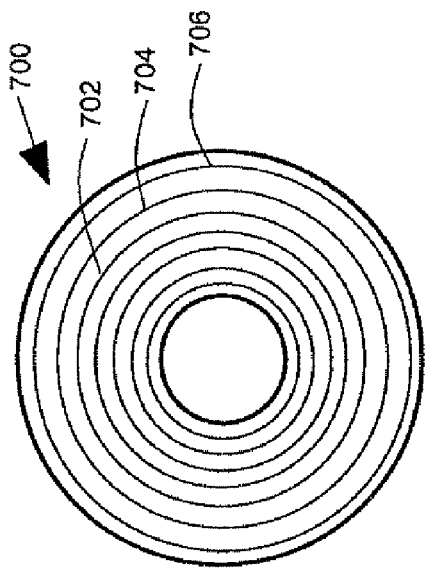
FIG. 7 illustrates a media disc that includes concentric tracks.
Figure 8:
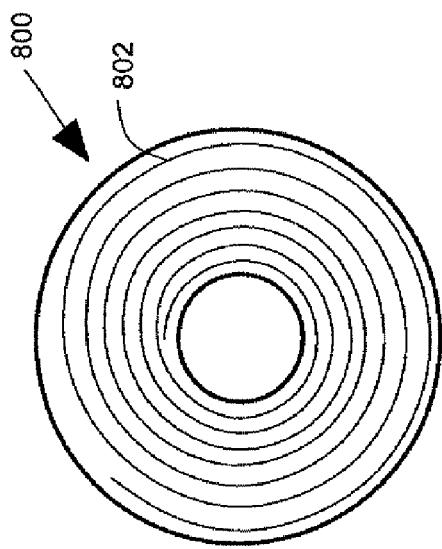
FIG. 8 illustrates a media disc that includes a spiral track

In one aspect, concentric data tracks comprise circular tracks (FIG. 7). In another aspect, concentric data tracks comprise concentric portions of a spiral track (FIG. 8). It will be understood that there are a very large number of multiple concentric data tracks on the high density media surface. The multiple recording tracks are disposed on an underlying disc substrate surface. Each track has a track width that is defined by a write width of a head (such as write width 228 in FIG. 2). Each track includes patterned media islands arranged sequentially or alternately at multiple radii along the circumferential length of the track.

During a write time interval, a read/write head (such as the read/write head 200 in FIG. 2) provides a write magnetic field (such as write magnetic field 220 in FIG. 2) with a write field shape (such as write field shape 218 in FIG. 2) to a selected track for writing. A voice coil motor (such as voice coil motor 118 in FIG. 1) positions the write field shape over the selected track. The write field shape is positioned by the voice coil motor along a head path that has a circular (or spiral) arc shape. The head path is defined by rotation of the voice coil motor about its axis of rotation.

A tangent line that is tangent to the track axis at the intersection with the head path comprises a spin motion axis (such as spin motion axis 230 in FIG. 2). The skew angle (such as skew angle 232 in FIG. 2) is approximately zero on a track near the middle diameter. The skew angle increases to a maximum skew angle near the inside diameter and near an outside diameter. Skew angles typically vary over a range of about +18 degrees to −18 degrees from the inside diameter to the outside diameter of the media disc.

The sequential or alternate staggering of islands allows the read/write head to write and read data sequentially on the staggered islands at approximately equally spaced time intervals only near the middle diameter. The staggering of islands is aligned symmetrically with the writer trailing edge because the skew angle is near zero at the middle diameter. The timing of read signals from islands is uniform as illustrated in FIG. 3A.

The staggering of islands allows the read/write head to write and read data on the sequentially staggered islands at significantly unequally spaced time intervals near an inner diameter (or an outer diameter). The staggering of islands is aligned asymmetrically with the writer trailing edge because the skew angle is near maximum near the inner diameter (or the outer diameter). The timing of read signals from islands near an inner diameter or an outer diameter is not uniform as illustrated in FIG. 3B.

With patterned "stagger mode" bit pattern media that has island positions that are not modified with a skew function, the skew angle variation as a function of disc radius will lead to undesired write and read modulation at larger skew angles. The skew angle causes both errors during writing and errors during read back. The error deteriorates the channel bit error rate (BER) at larger skew angles.

FIG. 3A represents timing of pulses generated by reading islands at successive circumferential positions 340, 342, 344, 346 in a track at a middle diameter. The pulses are uniformly spaced and have uniform pulse widths. The pulses in FIG. 3A are free of modulation distortion.

FIG. 3B represents timing of pulses generated by reading islands at successive circumferential positions 350, 352, 354, 356 in a track at an inner diameter or an outer diameter of a media disc. The pulses in FIG. 3B are irregularly spaced and have non-uniform pulse widths. The pulses in FIG. 3B have modulation distortion. The problem with modulation distortion is at a minimum at a middle diameter and worsens as skew angle increases and becomes worst at the inner and outer diameters. The problem with modulation distortion due to skew is substantially solved by adjusting circumferential spacing along the length of the track as a skew function of the track radius as described in examples shown in FIGS. 4A and 5.

There are thus problems with staggered patterned media that has spacings between islands that do not vary with skew angle. Variation in read and write timing as a function of skew angle places additional burdens on the read and write channel and bit error rate deteriorates as skew angle increases. These problems are overcome in the aspects described below in connection with FIGS. 4A, 4B, 4C, 5.

Figure 4A:
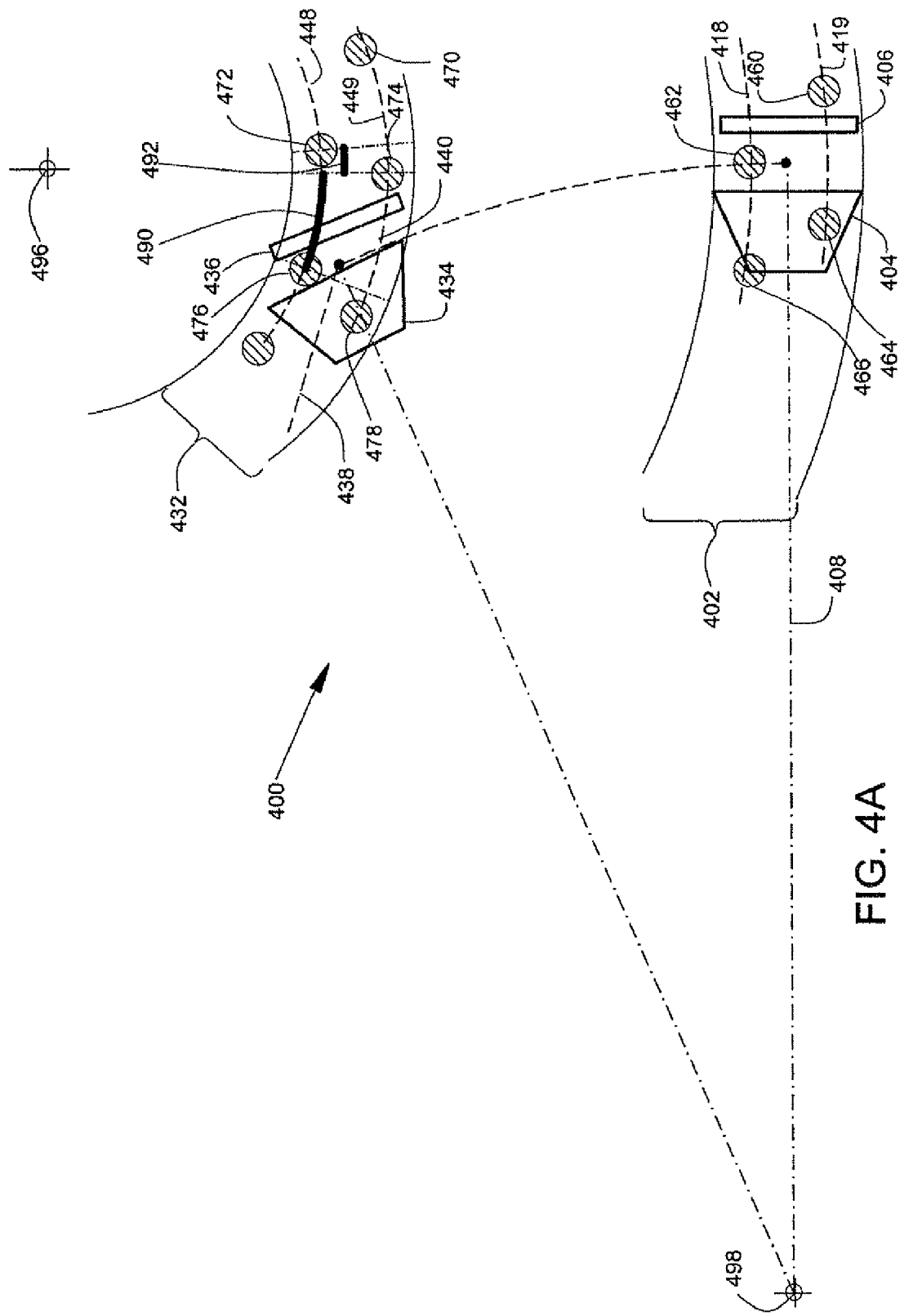
FIG. 4A illustrates patterned recording media with circumferential spacing of islands adjusted according to a skew function.

FIG. 4A illustrates patterned recording media 400. The patterned recording media 400 spins around a media spin axis 496. The patterned recording media 400 can comprise a spiral track (FIG. 8) or concentric tracks (FIG. 7). A voice coil motor (not illustrated in FIG. 4A) pivots around a voice coil motor pivot axis 498 to position a read/write head over the patterned recording media 400. The patterned recording media 400 comprises a track 402 near a middle radius of a media disc where a write field shape 404 and a reader surface shape 406 are aligned approximately normal to a spin motion axis 408. The spin motion axis 408 is aligned tangent to a track axis as illustrated. The patterned recording media 400 in track 402 comprises recording islands 460, 462, 464, 466 that are positioned alternately at different radii 418, 419. In track 402 which is at a zero skew angle, circumferential spacing between successive islands is substantially fixed.

The patterned recording media 400 comprises a track 432 near an inner radius of a media disc where a write field shape 434 and a reader surface shape 436 are not aligned normal to a spin motion axis 438. The spin motion axis 438 is aligned tangent to a track axis as illustrated. The patterned recording media 400 in track 432 comprises multiple recording islands 470, 472, 474, 476, 478 that lie on differing radii 448, 449. A circumferential spacing 492 (thick line) between islands 472, 474 is substantially different than a circumferential spacing 490 (thick line) between islands 474, 476.

The circumferential spacing varies between track 402 (where a skew angle is zero and circumferential spacings are fixed) and track 432 (where skew angle is large and circumferential spacing 490, 492 are significantly different). The circumferential spacing varies as a function of skew angle.

The skew function compensates for changes in a skew angle of the head accessing the group of multiple recording media islands. The alignment of the groups of islands is compensated to maintain a fixed timing relationship between the group of islands and the read/write patterns. The compensation is a minimum at the middle diameter and increases to larger compensation amounts for each track depending on how far away the track is from the middle diameter.

The staggering of islands allows the read/write head to write and read data on the staggered islands 460, 462, 464, 466 at approximately equally spaced time intervals only at the middle diameter as illustrated in FIG. 4A. The staggering of islands 460, 462, 464, 466 is aligned symmetrically with the writer trailing edge because the skew angle is near zero at the middle diameter. The timing of read signals from islands 460, 462, 464, 466 is uniform as illustrated in FIG. 4A.

The staggering of islands allows the read/write head to write and read data on the staggered islands 470, 472, 474, 476 at significantly unequally distance intervals, but fixed spaced time intervals near an inner diameter as illustrated in FIG. 4B. The staggering of islands 470, 472, 474, 476 is aligned asymmetrically with the writer trailing edge because the skew angle is near maximum near the inner diameter. The timing of read signals from islands 470, 472, 474, 476 is uniform as illustrated in FIG. 4B.

Multiple first and second patterned media islands are alternately placed at different first and second radii along a length of a recording track such that a recording head sequentially accesses first and second islands as the head moves along a length of the recording track. Spacings between successive first and second islands along the length of the track vary as a skew function of a track radius from a media spin axis. The timing of the read output is uniform in time in both FIGS. 4B, 4C. The staggering of islands as a function of the skew angle avoids variations in read and write timing, and provides a uniformly low bit error rate that is substantially independent of skew angle. The term "skew function", as used in this application, means a function that varies circumferential positions of media islands so that the varying circumferential positions reduce variations in time intervals between successively accessed media islands. The skew function adjust the circumferential positions of media islands to compensate for the variations in skew angle.

Figure 5:
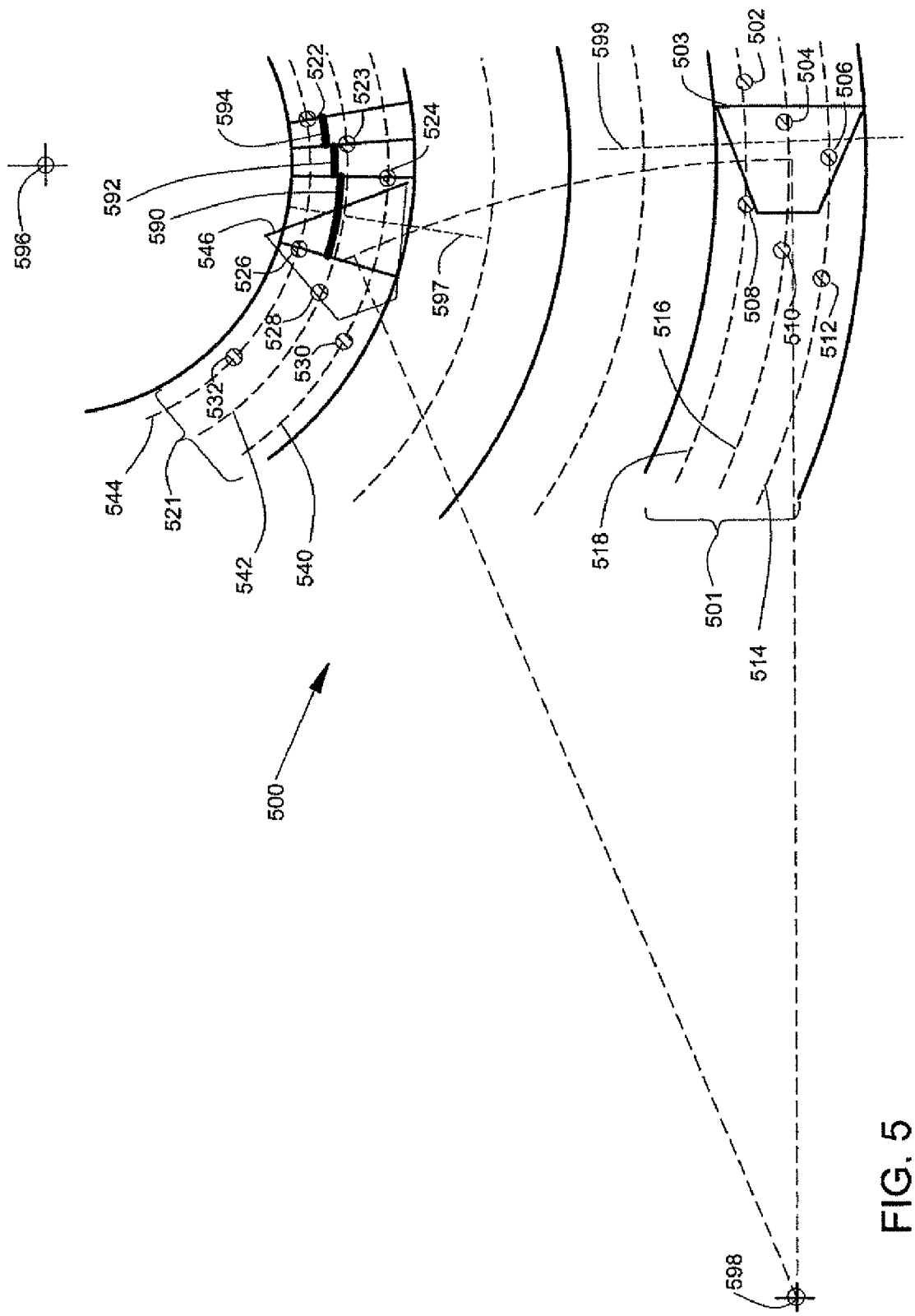
FIG. 5 illustrates patterned media that is similar to the patterned media in FIG. 4A in which magnetic islands are positioned at three different radii in each track.

FIG. 5 illustrates patterned media 500 that is similar to the patterned media 400 except that magnetic islands are positioned at three different radii in each track in FIG. 5. The patterned recording media 500 can comprise a spiral track (FIG. 8) or concentric tracks (FIG. 7). The read and write widths of a head are wide enough to access islands sequentially at the three different radii. Spacings between successive first, second and third islands along the length of the track vary as a skew function of a track radius from a media spin axis 596. The timing of the read output is uniform in time. The patterned recording media 500 spins around the media spin axis 596. A voice coil motor (not illustrated in FIG. 5) pivots around a voice coil motor pivot axis 598 to position a read/write head over the patterned recording media 500.

Near a middle diameter where the skew angle is nearly zero, multiple patterned media islands 502, 504, 506, 508, 510, 512 are sequentially placed at a first radius 514, a second radius 516 and a third radius 518 along a length of a first recording track 501 such that a recording head sequentially accesses the islands 502, 504, 506, 508, 510, 512 as the head moves along a length of the recording track. Since the skew angle is near zero on track 501, the islands are spaced apart at a fixed circumferential spacing. The circumferential spacing between islands 502, 504 is the same as the circumferential spacing between islands 506 and 508, for example. The circumferential spacings at the middle diameter can be uniform because the skew angle is approximately zero at the middle diameter. A trailing edge 503 of the write magnetic field shape is substantially parallel with a spin radius line 599 (radiating from axis 596) at the middle diameter. The timing of sequentially reading or writing the media islands has uniform circumferential time spaces between islands. The skew angle is approximately zero at the middle diameter, and the time intervals between sequential reading or writing of medial islands is also uniform.

Near an inner diameter where the skew angle is near its maximum, multiple patterned media islands 522, 523, 524, 526, 528, 530, 532 are sequentially placed at a first radius 540, a second radius 542 and a third radius 544 along a length of a second recording track 521 such that a recording head sequentially accesses the islands 522, 523, 524, 526, 528, 530, 532 as the head moves along a length of the recording track 521. Since the skew angle is near maximum on track 521, the islands are spaced apart at a varying circumferential spacing. The circumferential spacing 594 between islands 522, 523 is the same as the circumferential spacing 592 between islands 523 and 524, for example. The circumferential spacing 590 between islands 524, 526, however, is different than the spacings 592, 594.

The circumferential spacings at the inner diameter (and outer diameter) cannot be uniform because the skew angle is approximately maximum at the inner diameter. A trailing edge 546 of a write magnetic field shape is substantially skewed or canted with respect to a spin radius line 597 at the inner diameter. The timing of sequentially reading or writing the media islands, however, has uniform time spaces between islands. The varying circumferential spacing compensates for the skew to provide uniform timing spacing on track 521. Spacings between successive first, second and third islands along the length of the track vary as a skew function of a track radius from a media spin axis. The timing of the read output is uniform in time.

Figure 6:
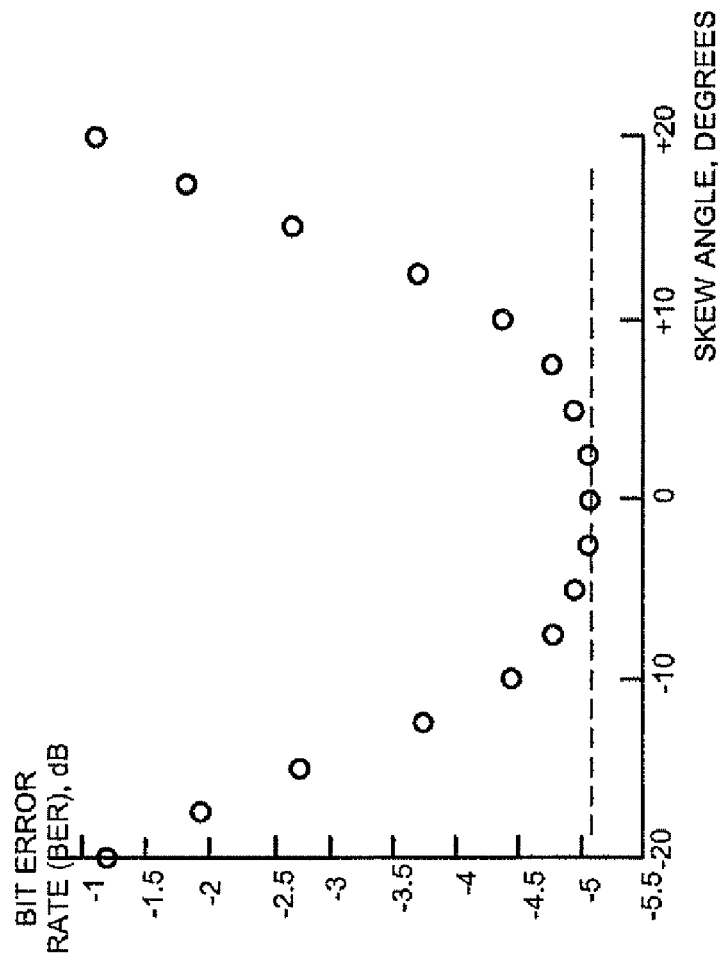
FIG. 6 illustrates a graph of bit error rate (BER) as a function of skew angle for media that does not have a pattern of islands adjusted according to a skew function.

FIG. 6 illustrates a graph of bit error rate (BER) as a function of skew angle for bit patterned media that is not adjusted by a skew function. As can be seen from FIG. 6, the bit error rate (represented by circles in FIG. 6) increases from a minimum at zero skew angle to increasing error rates as the absolute value of skew angle increases. The pattern of deteriorating bit error rate with increasing skew angle is avoided by use of bit patterned media as described where spacings vary according to a skew function. The bit error rate for bit patterned media with spacings adjusted by a skew function is approximately flat (represented by a dashed line in FIG. 6).

FIG. 7 illustrates a media disc 700 that includes multiple concentric tracks such as concentric tracks 702, 704, 706.

FIG. 8 illustrates a media disc 800 that includes a spiral track 802.

The islands at different radii in a track can also shift transverse to the track so that the radii are increasingly closer together as the absolute value of skew angle is increased. For example, for two-track stagger mode with successive islands arranged approximately along an axis at a 45 degree angle to the track axis, the amount of relative position shift in down track direction is about $\delta L = l_0 \sin(\theta)$ and relative cross track contraction is about $\delta W = l_0(1-\cos^2(\theta))$, where $l_0$ is the nominal pitch island size, which is about $1/\sqrt{2}$ of the island spacing at zero skew and $\theta$ is the skew angle.

According to one aspect, one of the islands comprise a single grain of storage media. According to another aspect the recording media comprises CoPt, CoPtB, FePt, CoPtP or other suitable magnetic media materials. According to yet another aspect islands have a major diameter of 25 nanometers or less. According to yet another aspect, nonmagnetic material filling spaces between islands can comprise $Al_2O_3$, SiO, SiN, $HfO_2$, $WO_x$, NbO, C or other suitable non-magnetic materials. According to yet another aspect, a separation between islands (i.e., a width of non-magnetic material) can range from 1 to 30 nanometers. According to yet another aspect, center-to-center distances between adjacent islands can be in the range of 10 to 50 nanometers.

In one aspect, the patterned recording media comprises magnetic recording media. In another aspect, the patterned recording media comprises optical media. In yet another aspect, the patterned recording media comprises magneto-optical media. In each of these aspects, the spacings between the sequential first and second islands along a length of a track vary as a skew function of a track radius.

It is to be understood that even though numerous characteristics and advantages of various aspects of the invention have been set forth in the foregoing description, together with details of the structure and function of various aspects of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the patterned media system while maintaining substantially the same functionality without departing from the scope and spirit of the present invention. In addition, although the preferred aspects described herein is directed to a disc drive system for with rotational patterns, it will be appreciated by those skilled in the art that the teachings of the present invention can be applied to other disc scanning patterns where skew affects bit error rate, without departing from the scope and spirit of the present invention. The aspects are useful with media patterns that are oriented toward Cartesian coordinate systems with heads or probes that skew relative to the Cartesian coordinate systems.

What is claimed is:

1. Recording media, comprising:
   multiple first and second patterned media islands sequentially placed at different first and second radii along a length of a recording track such that a recording head sequentially individually accesses first and second islands as the head moves along a length of the recording track; and
   spacings between the sequential first and second islands along the length of the track vary as a skew function of a track radius.

2. The recording media of claim 1 wherein the skew function provides compensation for changes in a skew angle of the head.

3. The recording media of claim 2 wherein the compensation reduces timing variation in writing data to the first and second islands.

4. The recording media of claim 2 wherein the compensation reduces timing variation in reading data from the first and second islands.

5. The recording media of claim 1 wherein the spacings between successive first and second islands within the recording track alternate between a shorter spacing and a longer spacing.

6. The recording media of claim 1 wherein the varying of the spacings as a skew function reduces a bit error rate of writing data.

7. The recording media of claim 1 wherein the varying of the spacing as a skew function reduces a bit error rate of reading data.

8. The recording media of claim 1 and further comprising third patterned media islands at a third radius.

9. The recording media of claim 1 wherein the track comprises a circular track.

10. The recording media of claim 1 wherein the track comprises a spiral track.

11. A method of formatting patterned recording media, comprising:
    sequentially placing multiple first and second patterned media islands at different first and second radii along a length of a recording track such that a recording head sequentially individually accesses the first and second islands as the head moves along a length of the recording track; and
    varying spacings between sequential first and second islands along the length of the track as a skew function of a track radius.

12. The method of claim 11 wherein the skew function compensates for changes in a skew angle of the head.

13. The method of claim 12 wherein the compensation reduces timing variation in writing data to the first and second islands.

14. The method of claim 12 wherein the compensation reduces timing variation in reading data from the first and second islands.

15. The method of claim 11 wherein the spacings between successive first and second islands within the recording track alternate between a shorter spacing and a longer spacing.

16. Patterned recording media, comprising:
multiple first and second patterned media islands sequentially placed for individual access at different first and second radii along a length of a recording track and wherein spacings between sequential first and second islands along the length of the track vary as a skew function of a track radius.

17. The recording media of claim 16 wherein the skew function provides compensation for changes in a skew angle of a head.

18. The recording media of claim 17 wherein the compensation reduces timing variation in writing data to the first and second islands.

19. The recording media of claim 17 wherein the compensation reduces timing variation in reading data from the first and second islands.

20. The recording media of claim 17 wherein the patterned recording media comprises magnetic media.

21. The recording media of claim 17 wherein the patterned recording comprises magneto-optical media.

22. The recording media of claim 17 wherein the patterned recording media comprises optical media.

* * * * *